Figure 1:
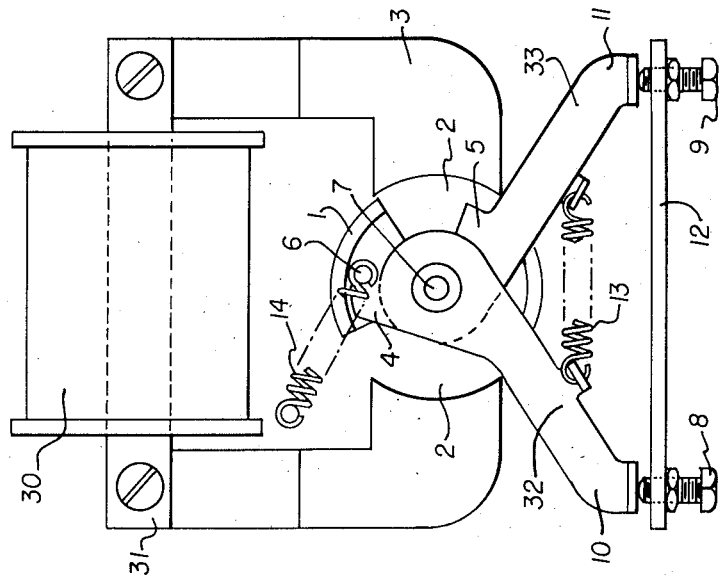

Oct. 9, 1951          E. A. BRYAN          2,570,518

OSCILLATING STEP MOTOR

Filed Aug. 6, 1947          3 Sheets-Sheet 1

INVENTOR.
Ernest Alfred Bryan

BY

Attorney

Oct. 9, 1951     E. A. BRYAN     2,570,518

OSCILLATING STEP MOTOR

Filed Aug. 6, 1947     3 Sheets-Sheet 2

INVENTOR.
Ernest Alfred Bryan

BY

Attorney

Oct. 9, 1951 E. A. BRYAN 2,570,518
OSCILLATING STEP MOTOR
Filed Aug. 6, 1947 3 Sheets-Sheet 3

INVENTOR.
Ernest Alfred Bryan
BY
Chas. M. Candy.
Attorney

Patented Oct. 9, 1951

2,570,518

UNITED STATES PATENT OFFICE 2,570,518

OSCILLATING STEP MOTOR

Ernest Alfred Bryan, Bexley, England, assignor to Siemens Brothers & Company Limited, London, England, a British company Application August 6, 1947, Serial No. 766,794
In Great Britain April 5, 1946

Section 1, Public Law 690, August 8, 1946
Patent expires April 5, 1966

11 Claims. (Cl. 172—36)

The present invention relates to automatic switches of the kind used for selecting, counting, marking and other purposes in telephone systems, and relates more particularly to driving mechanisms for such switches. Hereinafter, for convenience in description, a switch of the kind just set forth will be termed a switch of the kind just referred to.

The driving mechanisms hitherto employed in switches of the kind just referred to have been mainly of two kinds. In the case of one of these two known kinds, a driving mechanism comprises a stepping electromagnet, and is adapted to bring about a step-by-step operation of the switch concerned in response to a suitable intermittent energisation of this electromagnet. The stepping electromagnet has a spring-restored armature, which controls a stepping pawl, which co-operates with a ratchet. During the movement of the armature from its unoperated position to its operated position consequent upon energisation of the electromagnet, the magnetic attraction which gives rise to the movement rapidly increases, with the result that termination of the movement involves a hard blow of a moving part against a fixed part. The switch may be stepped during the movement of the armature from its unoperated position to its operated position (the so-called "forward" drive), or the switch may be stepped during the reverse movement of the armature (the so-called "reverse" drive). In the latter case, the spring-produced restoring forces acting on the armature have to be considerable, with the result that the termination of the reverse movement involves a hard blow of a moving part against a fixed part. The hard blows which have been mentioned are disadvantageous in that they tend to reduce the life of the mechanism and to give rise to undesirable noise and vibration.

The other of the two known kinds of driving mechanism referred to comprises a driving electromotor with a rotor which turns only in one direction during the setting of the switch concerned. This kind of driving mechanism suffers, in so far as some applications of switches of the kind referred to are concerned, from the disadvantage that it is better suited for a continuous hunting action than for step-by-step operation.

A main object of the present invention is the production of a switch of the kind referred to which has a driving mechanism constructed to bring about step-by-step operation with a reduction in the severity of the blows of moving parts against fixed parts, as compared with the previously-mentioned known kind of driving mechanism comprising a stepping electromagnet.

According to the present invention, there is provided a driving mechainsm wherein an electromagnetic system, formed by a wound stator and a spring-restored unwound rotor having a single normal and a single operated position, is constructed and arranged so that on the energisation of the stator during operation, there is exerted on the rotor a torque which produces forward movement of the rotor from its normal to its operated position and which varies during this movement so as to have a minimum value at the end thereof, and wherein a coupling mechanism provides for the stepping of the switch concerned by each such forward movement and for rendering reverse movements of the rotor ineffective. The driving mechanism is adapted to bring about a step-by-step operation of the switch concerned in response to a suitable intermittent energisation of the stator (for example, by an impulse train in an automatic telephone system). The reduction in the severity of the blows of moving parts against fixed parts which has been referred to, is obtained as a result of the facts that the torque exerted on the rotor falls to a minimum at the end of the forward movement of the rotor from its normal position to its operated position, and that the spring-produced restoring forces acting on the armature need not be very strong (since the drive is of the "forward" type). The coupling mechanism may conveniently be a simple form of clutch or a pawl and ratchet mechanism, and the main spindle of the switch may be driven through gearing.

In carrying out the invention, it is preferred to construct and arrange the electromagnetic system so that the torque exerted on the rotor is large (compared with the minimum) at the commencement of a forward movement of the rotor from its normal position to its operated position and diminishes throughout the whole or most of such movement. In general terms, this is conveniently achieved by arranging that the stator has one or more salient poles and that the rotor presents an edge to each salient pole of the stator at the commencement of the forward movement, the surface presented becoming greater during the movement until at the end of the movement a comparatively broad face is presented.

It is also preferred to arrange that a simple non-return pawl and ratchet mechanism prevents any possibility of return movement of the switch concerned in response to reverse movements of the rotor.

The movement of the rotor may be limited by adjustable stops engaging with a pin or arm mounted on the rotor. The pin or arm may also act on a toggle or equivalent mechanism for the closing and opening of electrical contacts which may, in certain circumstances, be included in the circuit for the stator energising winding, for the purpose of enabling the switch concerned to self-drive. The rotor and/or stator may be of laminated construction.

Figure 2:
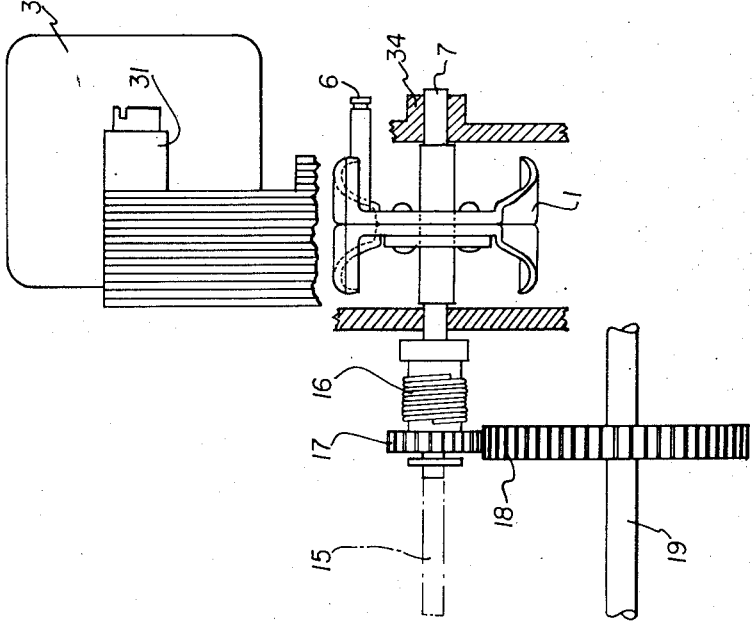
Figure 9:
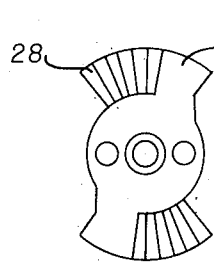
Figure 8:
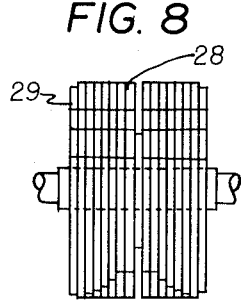
Figure 10:
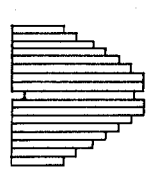
Figure 11:
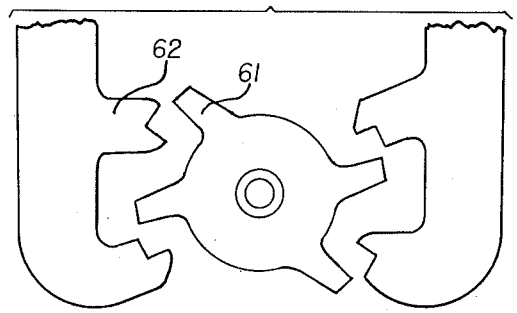
Figure 4:
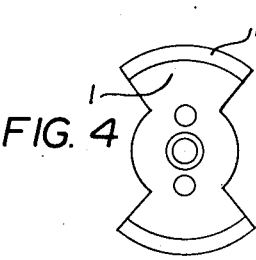
Figure 3:
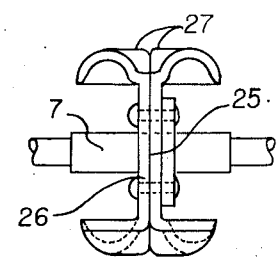
Figure 6:
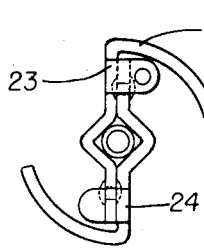
Figure 5:
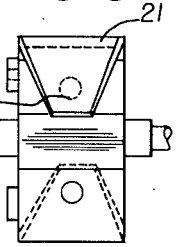
Figure 7:
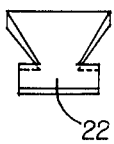
Figure 12:
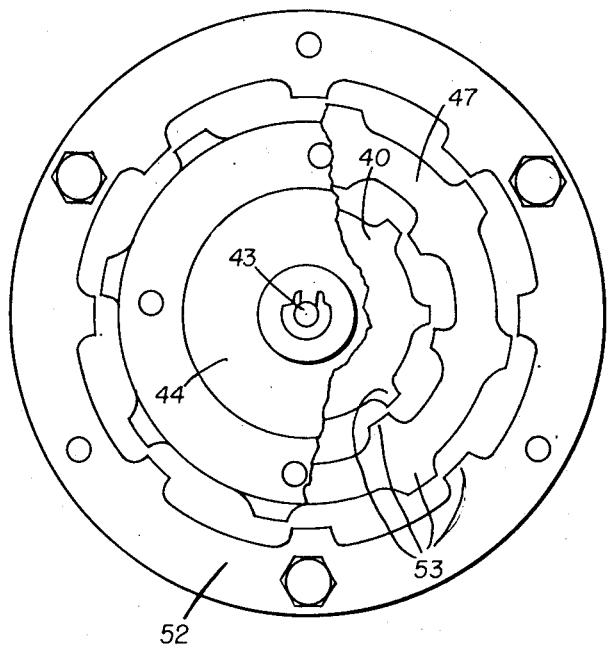
Figure 13:
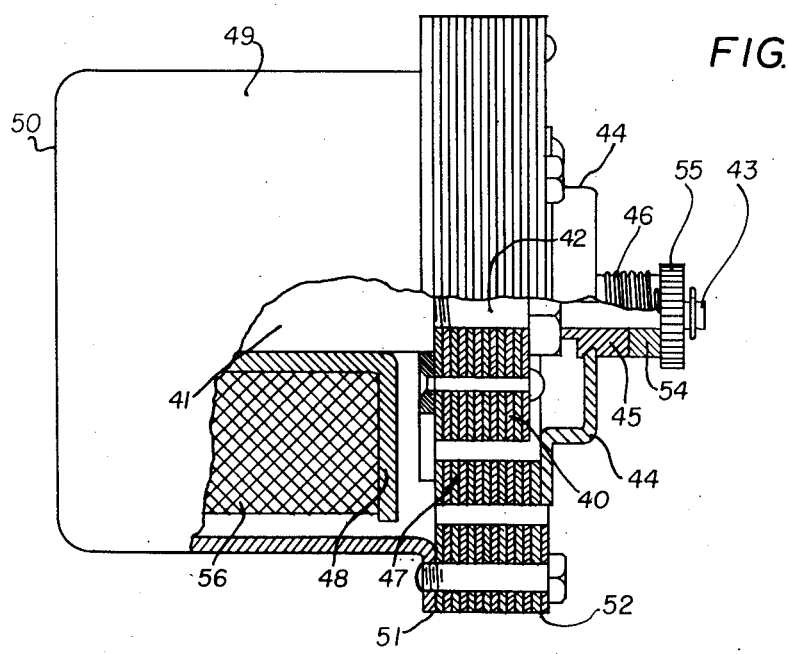

By way of example, various constructions which may be employed in carrying out the invention will now be described with reference to the accompanying drawings:

Fig. 1 of the drawings shows one part view of a driving mechanism in accordance with the invention, and Fig. 2 shows a further part view of this mechanism looking in the left-to-right direction of Fig. 1, and with the stator partly cut away to expose the rotor. Figs. 3 and 4 show side and axial views respectively of the rotor used in this driving mechanism, Figs. 5 and 6 show corresponding views of an alternative form of rotor, and Fig. 7 illustrates a modification of this alternative form. Figs. 8 and 9 show side and axial views respectively of a further alternative form of rotor, and Fig. 10 shows a view of this form looking in the upwards direction of Fig. 9. Fig. 11 illustrates a modification of the driving mechanism shown in Figs. 1 and 2, which involves the use of toothed pole-pieces and a toothed rotor. Figs. 12 and 13 show axial and side views respectively of a different type of driving mechanism in accordance with the invention.

Referring firstly to Figs. 1, 2, 3 and 4, the rotor in the driving mechanism illustrated in these figures is in the form of an unwound iron armature 1 comprising two pressings 25 and 26 (Fig. 3) which have the shape of shallow cups with large portions cut away, and which are secured back to back. The rotor is situated in a gap between the pole faces 2 of two iron pole-pieces 3 which form part of the stator. The pole faces 2 are regular in shape so that their developments are rectangles, and they and the rotor are co-axial. The rim portions 27 of the pressings 25 and 26 are shaped so that they conform to the bore of the pole faces 2 when viewed axially (as in Figs. 1 and 4) and so that they taper to produce a desired torque characteristic when viewed from the side (as in Figs. 2 and 3). The rotor is shown in its normal or unoperated position in Figs. 1 and 2. Its movement forward from this position to its operated position consists in making about a quarter of a revolution in the direction which is clockwise as seen in Fig. 1. The tapering of the rim portions 27, which has just been referred to, is such that each tapers from a comparatively broad width at its trailing edge to a narrower width at its leading edge (see Fig. 2). The tapering need not necessarily follow a linear law. The pole-pieces 3 of the stator are of laminated construction, and are joined at the ends remote from the pole faces by an iron yoke member 31. As shown, the stator winding or energising coil 30 surrounds the yoke member 31, but alternatively an energising coil may surround one or each of the pole-pieces. The movement of the rotor is limited by adjustable stops 4 and 5 engaging with a pin 6 projecting from the rotor. The stops 4 and 5 are formed by suitably shaped portions of two members 32 and 33. Each of these members is mounted to permit of its being rotated, for the purposes of adjustment, through a small angle about the axis of the rotor spindle 7. A suitable mounting is provided by arranging that a bearing 34 for the rotor spindle engages a clearance hole in each of the two members 32 and 33. The lower ends 10 and 11 of the two members bear against adjusting screws 8 and 9 in a mounting plate 12, and are held against the screws by means of a tensioned spring 13. The pin 6 is connected to the frame of the driving mechanism by a tensioned spring 14 which serves to restore the rotor from its operated position to its normal position when the stator winding 30 is de-energised. The spring is made as weak as is consistent with proper restoration. A coupling mechanism 16 provides for the stepping of the switch concerned by each forward movement of the rotor from its normal to its operated position, and for rendering reverse movement of the rotor ineffective. This coupling mechanism takes the form of a clutch of the kind in which ends of the two spindles 7 and 15 to be coupled are surrounded by a tightly coiled helical spring fixed to the rotor spindle so that in one direction of rotation of the rotor, the spring is wound more tightly, thereby driving the spindle 15, and in the other direction of rotation of the rotor, the spring tends to uncoil and slip over the spindle 15. The switch proper would be provided with a simple non-return pawl and ratchet mechanism to prevent any possibility of return movement of the switch in response to reverse movements of the rotor. The spindle 15 is geared to the main spindle 19 of the switch (carrying for example the switch wipers) by means of gear wheels 17 and 18. Alternatively, the spindle 15 may be of considerable length, as shown dotted, and may form the main spindle of the switch, so that the rotor spindle and the main spindle are co-axial. By reason of the construction and arrangement of the magnetic system, the torque due to magnetism, which on the energisation of the stator produces forward movement of the rotor from its normal to its operated position, has a minimum value at the end of such movement.

Referring now to Figs. 5 and 6, these show side and axial views respectively of a form of rotor which may be used instead of the form shown in Figs. 3 and 4. This alternative form is produced by bending two blanks 23 and 24 to the required shape and securing them back to back. The construction is such that the rotor is of approximately Z-shape when viewed axially (as in Fig. 6), the short limbs of the Z being shaped so that they conform to the bore of the stator pole-faces when so viewed, and so that they taper to produce a desired torque characteristic when viewed from the side (as in Fig. 5). As shown in Figs. 5 and 6, each short limb tapers from a comparatively broad width at its base 21 to a narrower width at the edge 20 which is intended to be the leading edge. Alternatively, if a large initial torque is required, each short limb may be shaped as illustrated in Fig. 7, the width being greater than the minimum at the leading edge, and decreasing sharply to the minimum at 22.

Referring now to Figs. 8, 9 and 10, these show views of a further form of rotor which may be used instead of the form shown in Figs. 3 and 4. Figs. 8 and 9 show side and axial views respectively of this alternative form, and Fig. 10 shows a view looking in the upwards direction of Fig. 9. This form is built up from laminations of graded sizes, there being in all four laminations of the largest size (designated 28 in the figures) and two laminations of each of six other sizes (the two of the smallest size being designated 29 in the figures). As in the case of the other constructions of rotor which have been described by way of example, the shape of the rotor is such that the faces which co-operate with the pole faces of the stator conform to the bore of the pole faces when viewed axially (as in Fig. 9), and taper to produce a desired torque characteristic when viewed from the side. It should be noted that whereas with the rotors shown in Figs. 3 and 5 the forward operating movement is a movement which is clockwise as viewed from the left, in the case of the rotor shown in Fig. 8 the corresponding movement is one which is clockwise as viewed from the right.

Referring now to Fig. 11, this illustrates a modification of the driving mechanism shown in Figs. 1 and 2 which involves the use of toothed pole-pieces and a toothed rotor. In this case both the rotor and the stator may remain constant in shape throughout their axial lengths. As shown, the rotor has four teeth 61 which co-operate with four stator teeth 62, two on each pole-piece. Apart from the form of the rotor and the pole-pieces, the construction may be similar to that of the driving mechanism which has been described with reference to Figs. 1 and 2. The stator teeth are stepped so that the air-gap path for the greater part of the flux changes gradually from a tangential to a radial direction as the rotor rotates (counter-clockwise as shown in the figure) from its normal position to its operated position.

Referring now to Figs. 12 and 13, these show axial and side views respectively of a different type of driving mechanism in accordance with the invention. In both figures parts of the mechanism are shown cut away so as to expose interior parts. In this type of driving mechanism, the rotor is in the form of an iron ring 47 of laminated structure and having teeth on both its inner and outer peripheries, the teeth being sidely spaced. The stator comprises an inner stator member 40 and an outer stator member 52, each of these members being constructed of iron laminations and provided with teeth corresponding in number and disposition to the teeth on the rotor. The inner stator member 40 is secured to an iron core 41 by means of a bolt 42, the head of which is extended in the form of a spindle 43. About the spindle 43 is loosely positioned a non-magnetic cup-shaped member 44 with a central bush 45. The bush 45 forms one part of a clutch 46 which is similar to and performs the same function as the clutch 16 in Fig. 2. Similarly to the driving mechanism of Fig. 2, the driven part 54 of the clutch 46 is shown as being arranged to drive the main spindle of the switch through gearing (including a pinion 55), but alternatively the main spindle may be co-axial with the spindle 43 and directly fixed to the part 54. The rim of the cup-shaped member 44 is secured to the rotor 47. The member 44 with its bush 45 provides a mounting for the rotor which permits rotation of the rotor about its axis. The core 41 is surrounded by a bobbin 48 carrying the stator winding 56, and the end of it remote from the bolt 42 is fixed to the end wall 50 of an iron casing 49 which has the form of a cylinder closed at one end and having a flange 51 at the other end. The outer stator member 52 is fixed to, and carried by, the flange 51. The rotor 47 and the two stator members 40 and 52 are of course concentric. As shown in Fig. 12 the rotor is in its normal position, and its rotation therefrom to its operated position is in a counter-clockwise direction. The teeth 53 may be shaped to assist in providing the required torque characteristic. The movement of the rotor is limited by stops (not shown in the drawing) which may be adjustable. A spring (also not shown in the drawing) serves to restore the rotor from its operated position to its normal position when the stator winding or energising coil is de-energised. The switch proper would be provided with a simple non-return pawl and ratchet mechanism to prevent any possibility of movement of the switch in response to reverse movements of the rotor.

I claim:

1. In an electric motor, a stator, a rotor having a single normal position and a single operated position, means for energizing said stator to thereby exert on said rotor a torque to cause movement of the rotor from said normal position to said operated position, magnetic poles on said rotor having pole faces which are substantially isosceles trapezoidal in shape, the leading edge of each face constituting the shorter side and the trailing edge the longer side of the two parallel sides of the face.

2. In combination with the motor of claim 1, driving means for driving an automatic switch, and coupling means associated with the rotor and said driving means for driving said driving means during movement of the rotor from the normal position to the operated position.

3. In an automatic switching system, an electric motor comprising a stator and a rotor, said rotor having a single normal position and a single operated position, said rotor acted on by a torque established during periods of energization of said stator to cause movement of the rotor from the normal position to the operated position, the pole faces of the rotor being substantially isosceles trapezoidal in shape, the leading edges being the shorter side and the trailing edges the longer side of the two parallel sides of the face, and means for restoring the rotor to the normal position during periods of deenergization of the stator.

4. In an automatic switching system as claimed in claim 3, driving means for driving an automatic switch, and one-way coupling means associated with the rotor and said driving means for driving the automatic switch during movement of the rotor from the normal position to the operated position and for rendering said switch unaffected by the rotor during restoration of the rotor from the operated position to the normal position.

5. In an automatic switching system, an electric motor comprising a stator and a rotor, said rotor having a single normal position and a single operated position, said rotor acted on by a torque established during periods of energization of said stator to cause movement of the rotor from its normal position to its operated position, a plurality of pole faces on said rotor each having their leading edges of narrower width than their trailing edges thereby causing a decrease in the value of the torque as the rotor moves from the normal position to the operated position, a spring for restoring said rotor to the normal position during periods of deenergization of the stator, a shaft driven by said rotor, a second shaft for driving an automatic switch, one-way coupling comprising a helical spring placed over the ends of the two shafts, said helical spring fixedly attached to said first shaft and rotatably affixed to said second shaft so as to fixedly grip said second shaft during movement of said first shaft in one direction and to slip over said second shaft during movement of said first shaft in the reverse direction to said one direction thereby driving the switch during movement of the rotor in one direction only.

6. In an electric motor, a stator, a rotor, a pole face on said rotor having the leading edge thereof of narrower width than the trailing edge, said rotor acted on by a torque established when said stator is energized to cause rotation thereof in a forward direction, the tapering of said pole face from said trailing edge to said leading edge causing a decrease in the value of the torque as the rotor moves in said forward direction, a first backstop for limiting the distance of movement of said rotor in said forward direction, means for causing said rotor to move in a return direction opposite to said forward direction when said stator is deenergized, and a second backstop for limiting the distance of movement of said rotor in said return direction.

7. In an electric motor, a wound stator, an unwound rotor, pole faces on said rotor having the leading edges thereof of narrower width than the trailing edges, the pole faces tapering from the trailing edges to the leading edges, said rotor acted on by a torque established when said stator is energized to cause a forward movement of said rotor, said tapering pole faces causing a decrease in the value of the torque as the rotor moves in said forward direction, a first backstop for limiting the distance of movement of said rotor in said forward direction and for stopping said rotor in a single operated position, means for causing said rotor to move in a return direction when said stator is deenergized, and a second backstop for limiting the distance of movement of said rotor in said return direction and for stopping said rotor in a single normal position.

8. In combination with the electric motor claimed in claim 7, a stepping switch driving mechanism, and one-way coupling means associated with said rotor and said driving mechanism for driving said driving means during movement of said rotor to said operated position.

9. An electric motor as claimed in claim 7 wherein said means for causing said rotor to move in a return direction is a helical spring.

10. In an electric motor, a wound stator, an unwound rotor, magnetic poles on said stator the faces of which are rectangular in shape and form parts of a cylindrical surface embracing and coaxial with said rotor, pole faces on said rotor corresponding to those on the stator conforming to the bore thereof when viewed axially, said pole faces being isosceles trapezoidal in shape, the leading edges of the rotor pole faces being the shorter side and the trailing edges being the longer side of the two parallel sides of the pole faces, said rotor acted on by a torque established when said stator is energized to cause a forward movement of said rotor, said tapering pole faces causing a decrease in the value of the torque as the rotor moves in said forward direction, a first backstop for limiting the distance of movement of said rotor in said forward direction and for stopping said rotor in a single operated position, means for causing said rotor to move in a return direction when said stator is deenergized, and a second backstop for limiting the distance of movement of said rotor in said return direction and for stopping said rotor in a single normal position.

11. In an automatic switching system, an electric motor comprising a stator and a rotor, pole faces on said rotor having the leading edges thereof of narrower width than the trailing edges, the pole faces tapering from the trailing edges to the leading edges, said rotor acted on by a torque established when said stator is energized to cause a forward movement of said rotor, said tapering pole faces causing a decrease in the value of the torque as the rotor moves in said forward direction, a first backstop for limiting the distance of movement of said rotor in said forward direction and for stopping said rotor in a single operated position, a helical spring tensioned during movement of said rotor in said forward direction for causing said rotor to move in a return direction when said stator is deenergized, a second backstop for limiting the distance of movement of said rotor in said return direction and for stopping said rotor in a single normal position, a shaft driven by said rotor, a second shaft for driving a stepping switch, one-way coupling comprising a helical spring placed over the ends of the two shafts, said helical spring fixedly attached to said first shaft and rotatably affixed to said second shaft so as to fixedly grip said second shaft during movement of said first shaft in one direction and to slip over said second shaft during movement of said first shaft in the reverse direction to said one direction thereby driving the switch during movement of the rotor in one direction only.

ERNEST ALFRED BRYAN.

REFERENCES CITED

The following references are of record in the file of this patent:

UNITED STATES PATENTS

| Number | Name | Date |
|---|---|---|
| 1,638,614 | Brewster | Aug. 9, 1927 |
| 1,733,872 | Graseby | Oct. 29, 1929 |
| 1,851,543 | Bossard | Mar. 29, 1932 |
| 2,096,458 | Johnson | Oct. 19, 1937 |
| 2,251,505 | Stephenson | Aug. 5, 1941 |
| 2,343,325 | Ranseen | Mar. 7, 1944 |
| 2,409,866 | Jewell | Oct. 22, 1946 |